United States Patent [19]

Blumenthal

[11] 4,037,946
[45] July 26, 1977

[54] FLEXIBLE BAR FOR SPECTACLE-FRAMES
[75] Inventor: Oreste Blumenthal, Turin, Italy
[73] Assignee: S.p.A. Giuseppe Ratti Industria Ottica, Turin, Italy
[21] Appl. No.: 542,957
[22] Filed: Jan. 22, 1975
[30] Foreign Application Priority Data
  May 28, 1974   Italy .................................... 68658/74
[51] Int. Cl.² .......................... G02C 5/16; G02C 5/18
[52] U.S. Cl. ..................................... 351/114; 351/117
[58] Field of Search ................................. 351/114, 117
[56] References Cited
U.S. PATENT DOCUMENTS 3,052,160  9/1962  Ratti ................................. 351/114 X
3,627,406  12/1971  Blumenthal ........................... 351/114
3,796,482  3/1974  Blumenthal ........................... 351/114

FOREIGN PATENT DOCUMENTS
1,121,362  1/1962  Germany .............................. 351/114

Primary Examiner—Paul A. Sacher
Attorney, Agent, or Firm—H. Dale Palmatier

[57] ABSTRACT

A flexible element for spectacle-frames, in particular a flexible bar for spectacles, comprising a chain of articulated elements traversed by a deformable longitudinal core arranged to hold them together is described. The chain of articulated elements comprises at least one articulated element formed substantially by a portion of a body of revolution defined by surfaces which are obtained by envelope from a generating plane figure which is made to rotate about an axis parallel and external to the figure itself.

8 Claims, 19 Drawing Figures

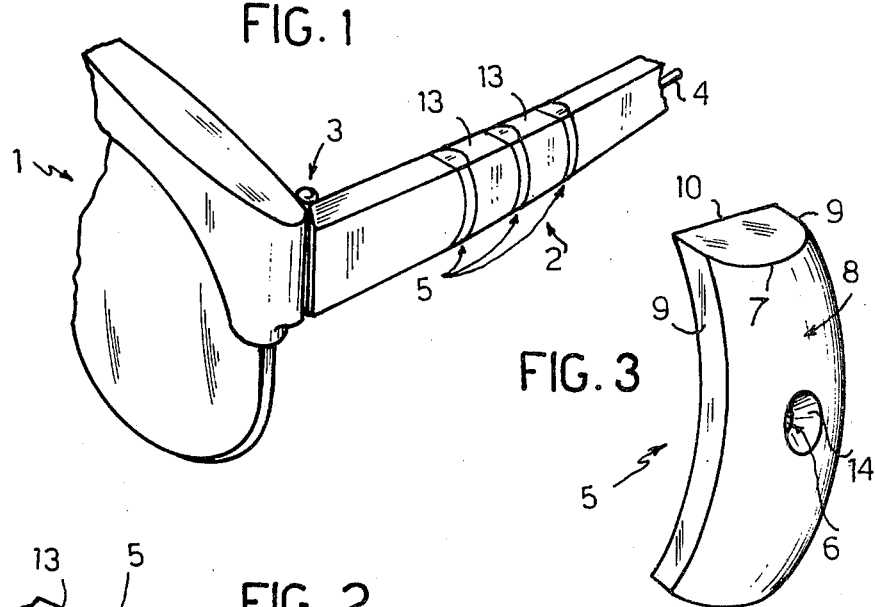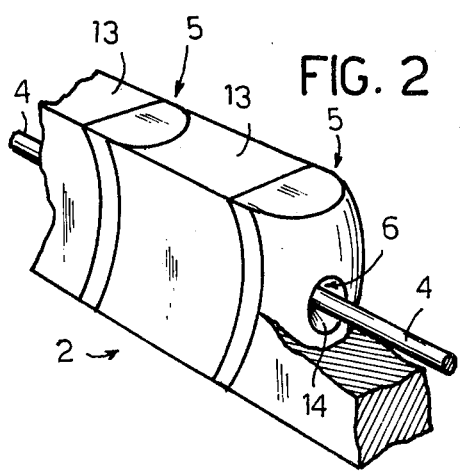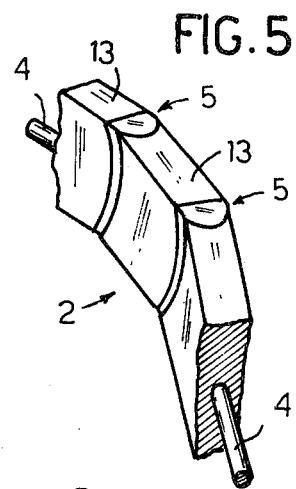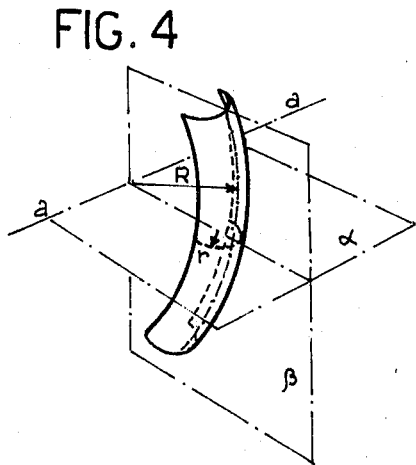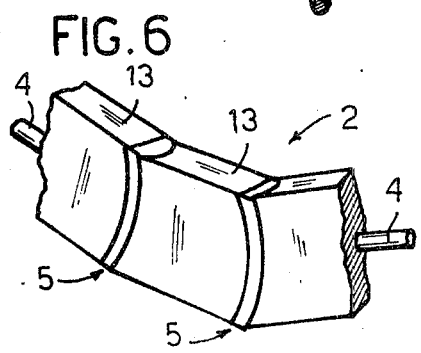

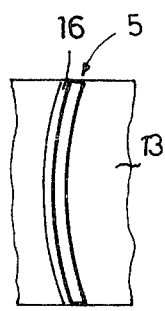
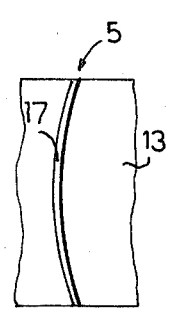
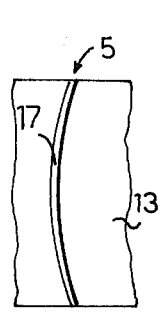
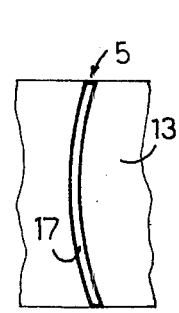

FIG. 15
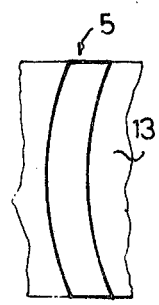
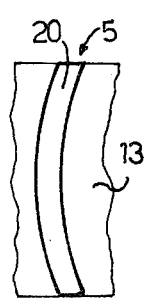
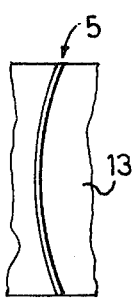
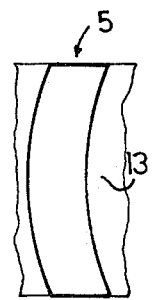
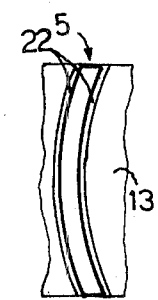

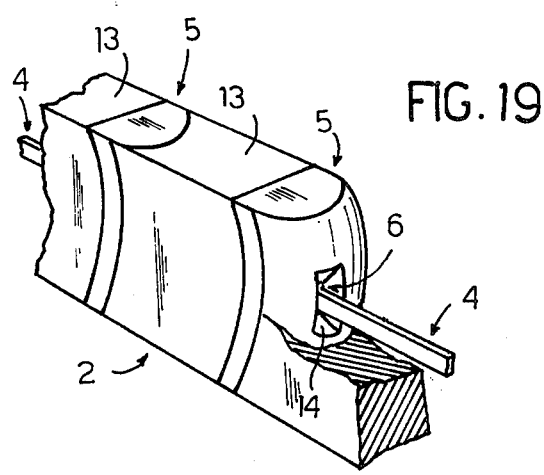
FIG. 19

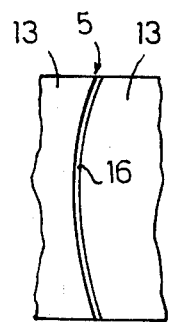
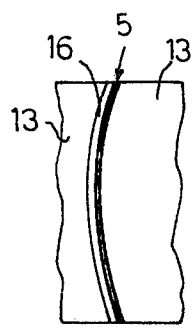
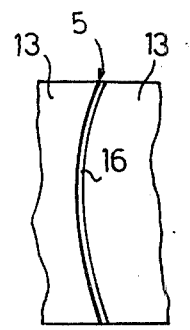

FLEXIBLE BAR FOR SPECTACLE-FRAMES

CROSS-REFERENCE TO RELATED APPLICATION

Applicant claims priority from corresponding Italian patent application Ser. No. 68658-A/74 filed on May 28, 1974.

BACKGROUND OF THE INVENTION

This invention relates to a flexible element for spectacle-frames which is apt to constitute a flexible bar for spectacles, having a high flexibility in two perpendicular planes and, in particular, in the plane which contains the longitudinal axes of the two bars of the frame and in the plane perpendicular to said plane.

There are known flexible bars comprising substantially a plurality of small blocks, between which there are disposed, alternately, elements provided with a spherical surface. The surfaces of each of said blocks which are facing said elements are spherical as well, and both the blocks and the elements are traversed by a core which is apt to hold them together. This allows to obtain a high flexibility of the bar in any plane passing through the axis of the bar and, in particular, also a certain rotation of the free end of the bar itself with respect to its end fixed to the frontal part of the frame; during the flexion of the bar there is a relative rotation of the blocks with respect to the spherical elements and, accordingly, a sliding between the coupled surfaces of said elements.

The above mentioned flexible bars have some disadvantages.

First of all, if it is desired the coupled surfaces of a block and of the respective spherical element to be very large, i.e., to have an area at least equal to or larger than that of the right section of the block, the diameter of said spherical elements must be very large. It follows that the element interposed between two contiguous blocks gives rise to rather large axial dimensions, measured in the direction of the longitudinal axis of the bar, and therefore, in a predetermined length of bar there can be housed only a rather small number of spherical elements and respective blocks coupled thereto.

Another disadvantage, which is more serious than the just mentioned one and which can be found especially in bars having a rather great height (i.e., in bars whose dimension measured in a direction perpendicular to the plane containing the longitudinal axes of the two bars of the frame is rather large), consists in that the radius of the spherical surfaces of the spherical elements which are necessary in this case, results in being too large to allow a good flexibility of the bar, in particular in the above-mentioned plane which contains the longitudinal axes of the two bars. In fact, in a ball joint, which the assembly formed by a spherical element and two contiguous blocks may be considered as comparable to, if the radius of the respective spherical surfaces is very large, for obtaining even a small relative rotation between two contiguous blocks it is necessary to have very great slidings between the coupled surfaces; obviously, great slidings hinder the flexion of the bar.

SUMMARY OF THE INVENTION

The object of the present invention is to provide a flexible bar for spectacle-frames which, while allowing to eliminate the above-mentioned disadvantages, permits to obtain a considerable flexibility of the bar both in the plane containing the longitudinal axes of the two bars of the frame and in the one which is perpendicular to it.

According to the present invention there is provided a flexible element for spectacle-frames, in particular a flexible bar for spectacles, comprising a chain of articulated elements traversed by a deformable longitudinal core arranged to hold them together, characterized in that said chain of articulated elements comprises at least one articulated element formed substantially by a portion of a body of revolution defined by surfaces which are obtained by envelope from a generating plane figure which is made to rotate around an axis parallel and external to the figure itself, and the articulated elements of the chain which are contiguous to said articulated element formed substantially by a portion of a body of revolution have their surfaces which face said element shaped correspondingly to the shape of the surfaces which define the element itself.

BRIEF DESCRIPTION OF THE DRAWINGS

For a better understanding of the invention particular embodiments, given by way of example, will now be described with reference to the accompanying drawings, in which:

FIG. 1 is a perspective view of a bar of a spectacle frame according to a first embodiment of the present invention, connected to the front part of the frame;

FIG. 2 is an enlarged partially sectional perspective view of a portion of the flexible bar shown in FIG. 1;

FIG. 3 is a perspective view of a rotation element which is part of the flexible bar of the embodiment shown in FIGS. 1 and 2 and is interposed between two contiguous blocks of the chain of articulated elements of the bar itself;

FIG. 4 is a diagrammatical representation of the main surface which defines the rotation element shown in FIG. 3;

FIG. 5 is a perpsective view of a portion of the bar in a deformed configuration in which the bar is substantially flexed in the plane which contains the longitudinal axes of the two bars;

FIG. 6 is a perspective view of a portion of bar in another deformed configuration in which the bar is flexed in a plane substantially perpendicular to the first mentioned plane;

Figure 7:
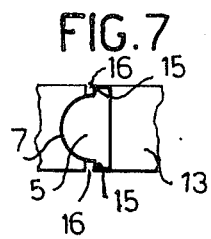

FIGS. from 7 to 18 show pairs of top and side views, respectively, of various embodiments of the rotation element interposed between two contiguous blocks of the bar according to the invention;

FIG. 19 is a perspective view showing a portion of a flexible bar according to a modified embodiment of the invention.

DETAILED DESCRIPTION OF THE INVENTION

With reference firstly to FIGS. 1 and 2, a spectacle frame (FIG. 1) is provided with a flexible bar 2 connected to the front part 1 of the spectacles by means of hinges 3 and having the shape of a rod of substantially rectangular cross-section.

The flexible bar 2 may be made of any material, in particular of a synthetic material such as celluloid or any plastic material (for example, cellulose acetate) or also of metal; said bar is traversed, longitudinally, by a core 4 which in the case of the embodiment shown in FIGS. 1 and 2 has a substantially circular cross-section. Naturally, the core 4 may have a cross-section different from that which has been indicated, for instance a rectangular one, as shown in the embodiment represented in FIG. 19; furthermore, said core, even if it is preferably made of metal, may be of any other elastic material.

In any part of the bar 2, conveniently in the part which is nearer to the respective hinge 3, there are disposed a plurality of rotation elements 5, each of which is provided with a hole traversed by a core 4. As it can be clearly seen from FIG. 3, each rotation element is constituted substantially by a portion of a body of revolution obtained by rotating a generating plane figure around an axis parallel and external to the figure itself. Conveniently, the plane figure generating said body of revolution may comprise, as is the case of the embodiment shown in FIGS. from 1 to 6, an arch of circumference 7 (FIG. 3) of predetermined radius apt to generate, by envelope, a corresponding surface which is indicated at 8 in FIG. 3 and which in the present description will be called the main surface or hearing surface of the rotation element 5. Said surface, shown diagrammatically in FIG. 4 showing said axis $a$—$a$ about which takes place the rotation of said plane figure, if it is intersected by a plane passing through the longitudinal axes of the bars (plane $\alpha$ of FIG. 4) originates an arch of circumference having the radius $r$, and if it is intersected by a plane perpendicular to said plane and passing through the axis of the core 4 (plane $\beta$) originates an arch of circumference having the radius R. Moreover, conveniently, as is the case of said embodiment, the shape of the plane figure generating each rotation element 5 may be such as to originate, by envelope, a pair of annular surfces 9 (FIG. 3) and a cylindrical surface 10, which surfaces further define the element itself.

It is clear that the number of rotation elements 5 comprised in each bar may be whichever and that said elements may be completely inserted inside the material forming the bar, so that the main surface 8 (FIG. 3), as defined above, of each of said elements will cooperate with a corresponding surface, having the same shape, formed in the material of the bar 2. It follows that the bar described hereinabove results in being constituted by a plurality of rotation elements 5 between which there are disposed blocks 13 which have opposite surfaces cooperating with the main surfaces 8 and 10, respectively, of the contiguous rotation elements. Both the rotation elements 5 and the blocks 13 are traversed by the core 4 which holds them together and thereby prevents them from separating from each another, which, instead, could occur in case of absence of the core 4. It has to be taken into consideration that the main surface 8 (FIG. 3) of each rotation element 5 cooperating with a corresponding surface of a block 13 is not clamped with the block but is instead allowed to accomplish a relative sliding with respect to it.

Conveniently the rotation elements 5 may be made of metal or of a synthetic material, for example a thermoplastic material, similarly to the bar 2.

Furthermore, at the ends of each hole 6 of each rotation element 5 traversed by the core 4 there are formed conical flarings 14 (FIGS. 2 and 4 and 19) so as to obtain a certain radial clearance between the core 4 and the surface of the flarings of said hole. Said flarings, instead of being formed in the holes 6 may be formed in the blocks 13 close to the holes, or both in the blocks and in the rotation elements.

According to an alternative solution, the holes 6 of the rotation elements 5, or the holes of the blocks 13, traversed by the core 4, have a diameter, or more generally dimensions, larger than the outer dimensions of the core 4, so as to leave a certain radical clearance between the inner surface of the hole 6 and the outer surface of the core; in particular, if the cross-section of the core is rectangular the respective holes of the rotation elements 5 and of the blocks 13 will have larger dimensions as compared with the dimension of the cross-section so as to leave a predetermined clearance between the core and the holes. Moreover, although not shown in the drawings, between the main surface 8 of a rotation element and the respective coupled surface of the contiguous block there is left a certain axial clearance, so as not to have said surfaces in contact with each other in the indeformed condition of the bar.

The operation of the flexible bar described hereinabove takes place as follows.

It will be supposed to grasp the end (not shown for the sake of simplicity) of the flexible bar 2 and to try to deform it by flexion in the plane containing the longitudinal axes of the two bars 2 of the frame (plane $\alpha$ in FIG. 4). In consequence of said displacement there occurs a flexion of the core 4 and a relative rotation of the blocks 13 with respect to the rotation elements 5, as shown in FIG. 5. Said flexion is permitted both by the presence of the flarings 14 of the holes 6 (FIGS. 2 and 3) and by the small axial clearances which practically exist between the main surfaces 8 of the rotation elements 5 and the respective complementary, similarly curved coupled surfaces of the blocks 13. In case the flarings 14 are missing, the flexion is allowed if there is anyway a radical clearance between the holes 6 of the elements 5 and/or of the blocks 13 and the core 4. Therefore, during the flexion of the bar 2 there is, as said before, a relative rotation of the blocks 13 with respect to the rotation elements 5, which rotation takes place in the plane in which the flexion of the core 4 is accomplished. In consequences of such relative rotation there is, obviously, a sliding between said coupling surfaces.

As soon as the external action applied on the free end of the bar 2 has ceased, because of the elasticity of the core 4 the bar is brought back into the indeformed configuration shown in FIG. 1.

It will now be supposed that the end of the flexible bar 2 is displaced such as to deform by flexion the bar itself in a plane perpendicular to the preceding one (plane in FIG. 4), as shown in FIG. 6. In this case the flexion takes places with modalities analogous to the one described previously.

The rotation elements 5 may also have a shape different from that shown in the just described embodiment, thereby obtaining substantially the same characteristics of flexion described hereinabove. Anyway, all the shapes of the rotation elements 5 which now be described and those which can easily be obtained therefrom through obvious modifications, are, according to the general concept of the invention, portions of bodies of revolution obtained by rotating a plane figure of any shape whatever about a rotation axis parallel and external to said figure.

In the case of the embodiment shown in FIG. 7, the plane figure generating the body of revolution comprises also a pair of rectilinear sides 15 and therefore the main surface 8 (FIG. 3) of each rotation element comprises two portions of cylindrical side surface. In this case, to allow the rotation of the bar in the plane containing the longitudinal axes of the bars of the frame it is, therefore, necessary to leave a small axial clearance 16 between said portions of surfaces and the corresponding surfaces of the contiguous blocks 13.

Figure 8:
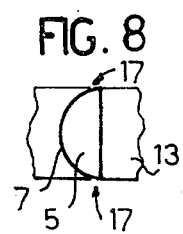

The shape of the plane figure of the embodiment shown in FIG. 8 differs from the fundamental shape described hereinabove only for the absence of the annular surfaces 9 (FIG. 3) which define laterally, from opposite sides, each rotation element 5. In this case, on each side surface of the bar, between two contiguous blocks 13, there is present only a notch 17 (FIG. 8) of very small dimensions.

Figure 9:
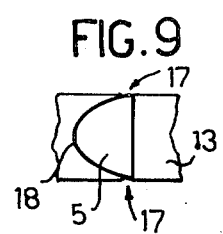

In the embodiment shown in FIG. 9, the plane figure generating the body of revolution is defined by a curved not circular line 18.

In the embodiments shown in FIGRS. from 10 to 18, each rotation element 5 comprises substantially a pair of curved main surfaces which therefore allow relative rotations of a corresponding block coupled with one of said surfaces; it follows that, in these cases, there may be a rotation between each rotation element and the two blocks which are situated on opposite sides with respect to said element, and not between said element and only one of said blocks, as occurred in the preceding embodiments.

Figure 10:
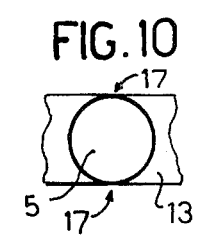

In the embodiment shown in FIG. 10, the plane figure generating the body of revolution is a circle, so that the rotation element is constituted substantially by a portion of a tore of cylindrical cross-section.

Figure 11:
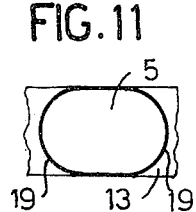
Figure 12:
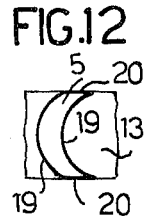
Figure 13:
Figure 14:
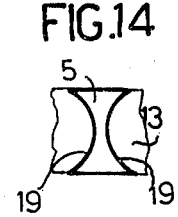

In the embodiment shown in FIGS. 11 and 12, and 14, the plane figure generating the body of revolution comprises two circumferences arches 19 having convexities facing the same side (FIG. 12) or opposite sides (FIGS. 11 and 14). The embodiment shown in FIG. 13 is similar to that of FIG. 12 with the only difference that there are missing the rectilinear sides 20 which defined said figure.

The embodiment shown in FIG. 15 differs from that of FIG. 11 only for the presence of rectilinear portions 21 in the plane figure generating the body of revolution, and of clearances 22 between the surfaces generated by said portions and the corresponding surfaces of the contiguous blocks.

Figure 16:
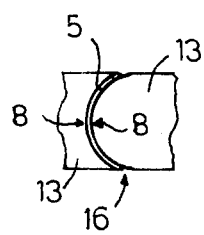
Figure 17:
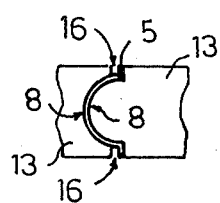
Figure 18:
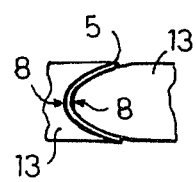

The embodiments shown in FIGS. 16, 17 and 18 provide thin rotation elements 5 made of plate, each of which comprises a pair of opposite main surfaces 8. Said embodiments, except for the thickness of each rotation element 5, are conceptually equal to those of FIGS. 12, 7 and 9, respectively, from which they derive.

It is obvious that the scope of the invention includes also an embodiment as that of FIG. 19, in which the core 4 has a rectangular section instead of a circular one. The dimensions of said section may be chosen so as to obtain a different rigidity to flexion of the core itself in the plane which contains the longitudinal axes of the bar and in the plane which is perpendicular to said plane, in order to obtain in said two planes a different deformability by flexion of the bar. In the scope of the invention is included anihow a flexible element in which the rigidity of said core in one of said planes is so high as to make it substantially indeformable by flexion in said plane.

What we claim is:

1. A flexible element for temples of spectacle-frames, comprising a bar formed of a chain of articulated elements traversed by a deformable longitudinal core arranged to hold them together, in which adjacent articulated elements have similar curved bearing surfaces confronting each other and nesting together for relative movement as the bar is flexed, said articulated elements also having side and end faces defining the girthal periphery of the bar, at least one such articulated element having a shape formed substantially by a portion of a body of revolution defined by surfaces which are obtained by an envelope from a generating plane figure which is made to rotate through an arc about an axis parallel to and spaced from the figure itself, the side and end faces of the articulated elements being unobstructed to permit free movement therebetween during flexing of the bar, said core being deformable to at least flex about axes lying parallel to said axis.

2. A flexible element according to claim 1, in which between said core of the bar and at least a part of the holes of at least some of said articulated elements of the chain there is left a certain radical clearance in order to allow, during the flexion of said flexible element, a relative rotation between said articulated elements of the chain.

3. A flexible element according to claim 1, in which between the surfaces of two contiguous articulated elements of the chain there is left a certain clearance, so as not to have said surfaces in contact with each another in the indeformed condition of the flexible element, in order to allow the flexibility of the element itself.

4. A flexible element for temples of spectacle-frames, comprising a bar formed of a chain of articulated elements traversed by a deformable longitudinal core flexible in all directions and arranged to hold such articulated elements together, the adjacent articulated elements having similar curved bearing surfaces confronting each other and nesting together for relative movement as the bar is flexed, said articulated elements also having side and end faces defining the girthal periphery of the bar, at least one such articulated element having a shape formed substantially by a portion of a body of revolution defined by surfaces which are obtained by an envelope from a generating plane figure which is made to rotate through an arc about an axis parallel to and spaced from the figure itself, said generating plane figure having at least one curved side consisting in an arch of circumference, the radius of said arch of circumference is smaller than the minimum distance of the arch itself from said axis about which said generating plane figure is made to rotate, so that said circumference arch generates by envelope a surface which, intersected by a plane passing through said axis and by a plane orthogonal to the latter, originates two arches of circumference of substantially different radius, the side and end faces of the articulated elements being unobstructed to permit free movement therebetween during flexing of the bar.

5. The flexible element according to claim 4 wherein said bar and articulated elements have a width between said side faces and have a depth between said end faces, the radius of said first mentioned arch of circumference being significantly different than one-half the width of said bar.

6. The flexible element according to claim 5 and the radius of said first mentioned arch of circumference is significantly greater than half the width of the bar.

7. The flexible element according to claim 5 and said minimum distance of the arch itself from said axis about which said generating plane figure is made to rotate, being significantly greater than one-half the depth of the bar.

8. A flexible element for temples of spectacle-frames, comprising an elongate bar including a chain of articulated elements transversed by a deformable longitudinal core arranged to hold them together, the bar having a depth from top to bottom which is significantly greater than the width of the bar from side to side, adjacent articulated elements having complementary, similarly curved bearing surfaces confronting each other and nesting together for relative sliding along each other as the bar is flexed, the bearing surfaces extending substantially from top to bottom and substantially from side to side across the bar, and said bearing surfaces having compound curvature in a first direction through a circular arc extending from top to bottom of the bar, and also through a circular arc in a second direction from side to side of the bar and with a rate of curvature significantly greater than the curvature in said first direction from top to bottom of the bar.

* * * * *